June 23, 1936.  T. E. HURD  2,045,187
LAWN MOWER SHARPENER
Filed Aug. 4, 1934
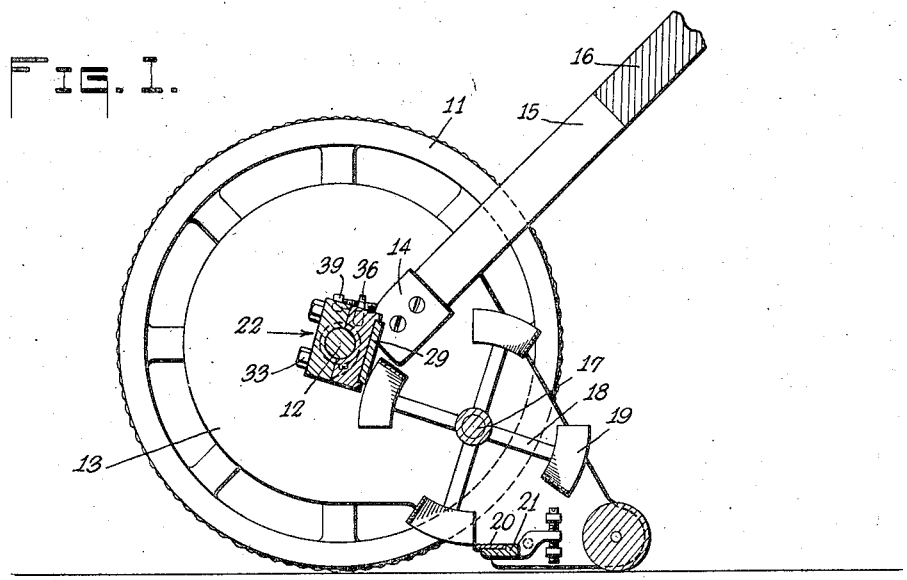
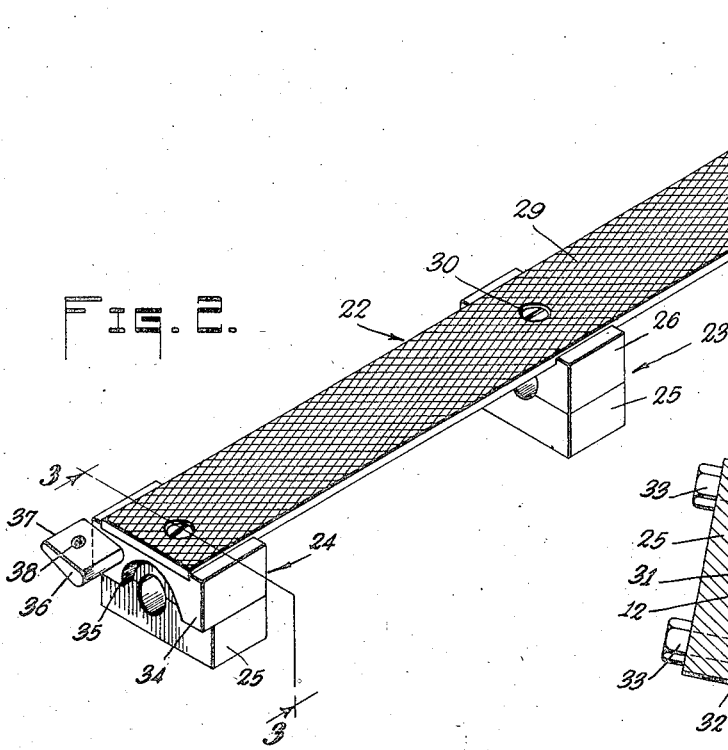
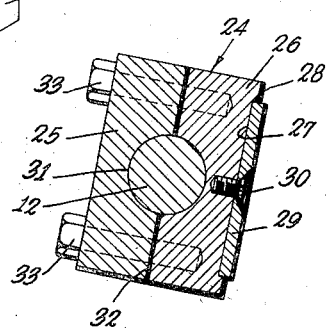
INVENTOR
T. E. HURD
By Hazard and Miller
ATTORNEYS.

Patented June 23, 1936

2,045,187

UNITED STATES PATENT OFFICE 2,045,187

LAWN MOWER SHARPENER

Thomas E. Hurd, Glendale, Calif.

Application August 4, 1934, Serial No. 738,419

3 Claims. (Cl. 76—82.1)

An object and feature of my invention is a lawn mower sharpener using a file, which file may be clamped on the fixed axle shaft common to most lawn mowers having rotating blades.

A further object and feature of my invention is attaching the file to blocks which may be clamped to the non-rotating axle, these blocks being slightly rotatable on the fixed axle to bring the file into and out of contact with the rotating blades so that the blades may be sharpened by movement of the lawn mower as in cutting, or the file may be disengaged from the blades when properly sharpened for using the lawn mower in cutting grass. In addition, I have an adjusting means comprising set screws operating through lugs on end blocks, these set screws engaging a stationary part of the lawn mower and thus being adapted for slightly tilting the blocks and the file.

My invention is illustrated in connection with the accompanying drawing, in which:

Fig. 1 is a vertical longitudinal section through the typical lawn mower showing the attachment of my invention.

Fig. 2 is a perspective view of the attaching blocks and the file.

Fig. 3 is a detailed section on the line 3—3 of Fig. 2 in the direction of the arrows.

Referring to Fig. 1, this illustrates a typical lawn mower having wheels 11, a fixed shaft 12, a housing structure 13 with sockets 14 to which is connected a yoke 15 of the handle 16, a rotary shaft 17 with a series of radial spokes 18 on the outer ends of which are the cutting blades 19. These blades operate in conjunction with a fixed cutter blade 20 mounted on a support 21.

A feature of my invention is in mounting the sharpener in such a manner that when the lawn mower is moved either over a lawn or a pavement, the rotation of the blades will cause their sharpening.

In my invention I employ a sharpener assembly designated by the numeral 22. This includes center blocks 23 and a pair of end blocks 24. Each of these block assemblies has a clamping block section 25 and a file supporting block section 26. This latter has a shallow groove 27 with shoulders 28 on each edge of the groove in which is supported the file 29, this file being secured by screws 30 which are illustrated as having countersunk heads. Each block section has a semi-circular opening 31 and they have a joint 32, the block sections being clamped together by clamping screws or bolts 33. The joint should have a slight clearance so that the bolts can clamp the two block sections firmly to the fixed shaft or rod 12.

The end block sections 24 have the file supporting block offset wider than the clamping block as indicated at 34, and this has a semi-circular recess 35. The purpose of this recess is to accommodate the block on a projection on the housing structure 13 at the ends of the shaft 12.

A lug 36 is secured to each end block assembly 24 and preferably to the block section carrying the file. Each lug has a tip end 37 which extends beyond the end edge of the blocks and is provided with a threaded perforation 38 through which extends a set screw 39, each set screw being adapted to engage one of the sockets 14 on which the handle is mounted. The manner of adjusting the improved sharpener is as follows:

The blocks are attached to the axle 12 sufficiently tight so that the blocks will not rotate freely on this shaft but will have a considerable frictional grip but may be rotated by applying sufficient force. The end of the set screw is brought to bear against the sockets 14 and is tightened, thus rotating the block assembly and the file on the shaft 12. While this adjustment is being made, if one of the blades 19 is positioned to engage the file and form the desired contact between the file and the blocks, then when the set screw is properly tightened, the lawn mower may be advanced and the blades rotated in their normal rotation of travel which is counterclockwise relative to Fig. 1. This causes the blades to contact and rub over the exposed surface of the file, thereby sharpening the blades. As the blades become worn in filing the set screw 39 may be slightly adjusted to bring a proper bearing pressure between the blades and the file.

When the blades are properly sharpened and it is desired to discontinue the sharpening action, it is not necessary to move the file and the sharpener assembly as the set screw 39 may be loosened and the block 24 forcibly rotated in a clockwise direction having reference to Fig. 1 on the fixed shaft 12 a sufficient amount to leave a clearance between the edges of the blades 19 and the file. Each set screw may then be brought into contact with one of the sockets 14 and thus will prevent rotation of the blocks into a position which might engage the blades and the file. The lawn mower may then be used for cutting grass without removing the blocks and the file.

Various changes may be made in the details of construction without departing from the spirit or scope of the invention as defined by the appended claims:

I claim:

1. A lawn mower sharpener comprising a plurality of split blocks having openings therethrough to engage a fixed shaft of a lawn mower, each block being thus divided into two substantially equal halves, clamping screws to clamp the two halves of each block to the shaft, one-half of each block having a shallow groove on an outer face, a file fitted in each of the shallow grooves and secured to each of the blocks whereby the blocks are connected together as a unit, and means to rotate the blocks and the file as a unit on the fixed shaft whereby the file may contact rotating blades on a lawn mower on a line closely contiguous to a plane containing the fixed shaft and the axis of rotation of the blades, the means to rotate the split blocks on the shaft comprising a lug projecting from each end block and an adjusting set screw through each lug adapted to engage a fixed part of the lawn mower, to positively prevent rotation of the blocks due to sharpening contact of the blades and the file.

2. In a lawn mower sharpener in which a lawn mower has a fixed shaft, a rotating shaft with cutting blades thereon, a fixed structure at the opposite ends of the fixed shaft combined with a clamp formed with a plurality of split blocks, means to clamp said blocks to the fixed shaft, a file secured to said blocks and screw means interengaging the end blocks of the clamp and the fixed structure at the end of the fixed shaft to adjust the file to intersecting a plane drawn through the fixed shaft and the rotating shafts, whereby the blades in rotation contact the file closely contiguous to such plane.

3. In a device as described, in which a lawn mower is provided with fixed side structures, a rotatable shaft having cutting blades, a fixed shaft secured in the side structure, the said shafts being parallel combined with a sharpening assembly having a plurality of clamps, each substantially rectangular in longitudinal cross section, each clamp having a diametrical split block surrounding the fixed shaft and having an opening for the shaft and attached to the shaft by bolts, each clamp being thereby divided into two parts which are substantially equal, one part of each clamping block having a shallow groove, a file fitted in all the shallow grooves and secured to each of the clamping blocks, the file being therefore operative to space the clamping blocks on the fixed shaft, and means interengaging between the end blocks of the clamp and the fixed side structure of the lawn mower on opposite sides to rotate the clamps and hence the file to position the file to engage the rotating blades, the interengaging means between the blocks and the fixed structure comprising each of the end blocks having the portion to which the file is secured, wider on the side of the split having the file than the opposite side and having a lug extending from such wider portion of the block and a screw through each lug to engage a portion of the fixed side structure of the lawn mower.

THOMAS E. HURD.